O. H. WHITNEY.
Rotary-Pump.

No. 167,374.  Patented Aug. 31, 1875.

WITNESSES:
E. A. West
O. W. Bond

Orlando H. Whitney
INVENTOR

UNITED STATES PATENT OFFICE.

ORLANDO H. WHITNEY, OF WAUKEGAN, ILLINOIS.

IMPROVEMENT IN ROTARY PUMPS.

Specification forming part of Letters Patent No. 167,374, dated August 31, 1875; application filed July 14, 1875.

*To all whom it may concern:*

Be it known that I, ORLANDO H. WHITNEY, of Waukegan, Lake county, State of Illinois, have invented new and useful Improvements in Rotary Pumps, of which the following is a full description, reference being had to the accompanying drawings, in which—

Figure 1:
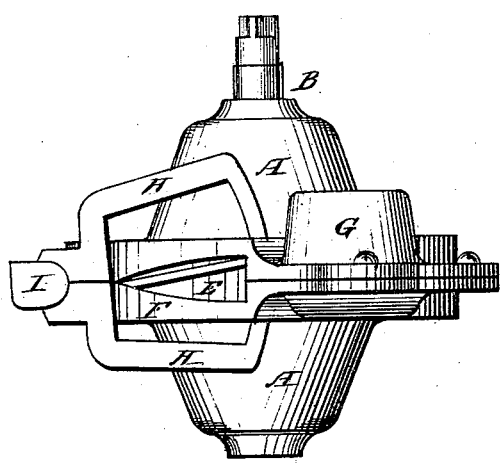
Figure 2:
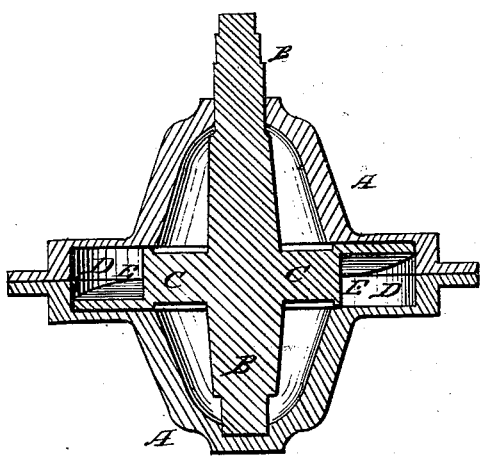
Figure 3:
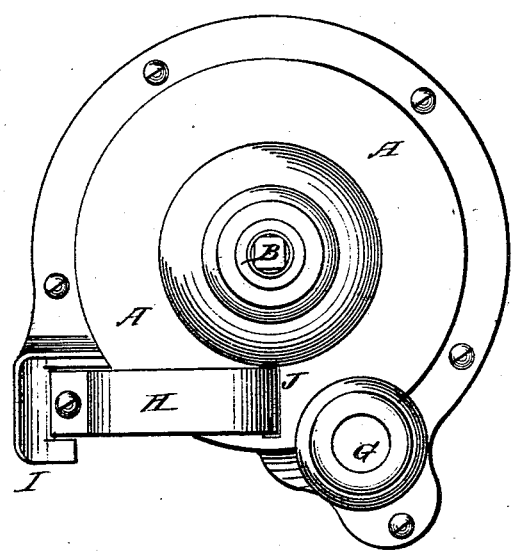
Figure 4:
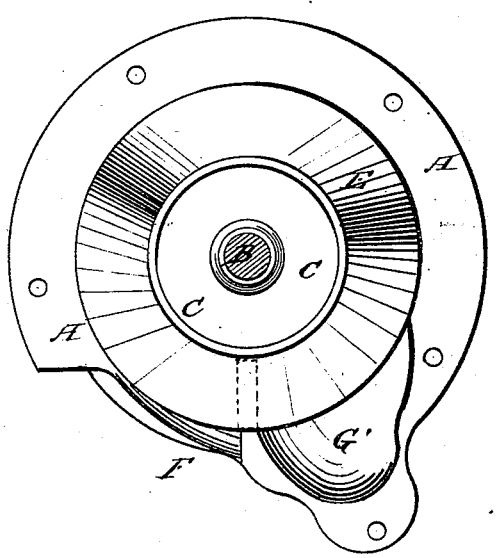

Figure 1 is an elevation; Figure 2, a section; Fig. 3, a top view; Fig. 4, a view with the upper section of the shell removed.

The nature of my invention consists in providing the interior cylinder or drum with a spiral flange, so as to combine both pressure and lifting in forcing water out of the pump.

In the drawings, A represents the shell or case; B, the shaft; C, the cylinder or drum; D, the annular space for the spiral flange; E, the spiral flange; F, the inlet; G G', the outlet; H, the swinging cut-off; I, the shoulder or pivot upon which the cut-off turns and is supported.

The case A is made of cast-iron, or other suitable material, and is made somewhat elongated to give stronger bearings to the shaft B. It is made in sections or halves, and bolted together, as shown. It is provided with an annular space, D, into which the cylinder C enters sufficiently far to close it, as shown at Fig. 2. The cylinder C may be made of a separate piece, and attached to the shaft B, or the two parts may be cast in one, as desired. The spiral flange E also may be cast with it, or be separately attached, as may be desired or found most convenient in manufacture. The spiral flange E passes from one edge to the other of the cylinder C in making one-half turn around it, and is made to fit the annular space D in which it runs, and across which it passes once at each half revolution. In order to prevent the water from flowing out at the inlet I attach a swinging cut-off, H, which is made in halves, as shown at Fig. 1, and bolted together, so that the inner ends will just come in contact with the flange E and close the space D. This cut-off H swings backward and forward on the rounded bracket I as the spiral flange E passes from side to side of the annular space D, and prevents the outflow of the water at the inlet F, and also prevents the water from following around, and forces it out at the opening G, to which any suitable pipe or tubing may be attached.

As shown, the pump is organized for a submerged force-pump; but by packing the shaft B, and attaching suitable connections to the inlet F, it may be used as a suction-pump or a combined suction and force pump, and, if desired, one of the passages may be made through the shaft by making it hollow.

By the use of the flange E I am able to lift or force water very rapidly or at great heights with a small outlay of power, as the operation is that of pressure and lifting.

Power may be applied to the shaft B in any suitable or well-known manner.

This device, by enlarging its parts, can be used as an efficient air-blower, and for blowing air the annular space D may be relatively considerably enlarged, and a stronger incline may be given to the spiral flange E.

What I claim as new, and desire to secure by Letters Patent, is as follows:

1. The swinging valve H, in combination with the spiral flange E and annular space D, substantially as set forth.

2. The combination of the case A, provided with an annular space, D, with the shaft B, cylinder C, spiral flange E, and swinging cut-off H, substantially as described.

ORLANDO H. WHITNEY.

Witnesses:
E. A. WEST,
O. W. BOND.